US011216611B2

(12) United States Patent
Okamoto et al.

(10) Patent No.: US 11,216,611 B2
(45) Date of Patent: Jan. 4, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Takuya Okamoto, Kanagawa (JP); Akiko Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 308 days.

(21) Appl. No.: 16/159,124

(22) Filed: Oct. 12, 2018

(65) Prior Publication Data

US 2019/0129927 A1    May 2, 2019

(30) Foreign Application Priority Data

Oct. 26, 2017  (JP) .............................. JP2017-207555

(51) Int. Cl.
*G06F 40/169*   (2020.01)
*G06F 3/14*     (2006.01)
*G06F 3/0483*   (2013.01)
*G06F 3/0484*   (2013.01)
*G06F 3/0482*   (2013.01)
*G06F 17/00*    (2019.01)

(52) U.S. Cl.
CPC .......... *G06F 40/169* (2020.01); *G06F 3/0483* (2013.01); *G06F 3/14* (2013.01); *G06F 3/0482* (2013.01); *G06F 3/04845* (2013.01)

(58) Field of Classification Search
CPC ........ G06F 40/169; G06F 3/0483; G06F 3/14; G06F 3/04845; G06F 3/0482; G06F 17/241
See application file for complete search history.

(56) References Cited

U.S. PATENT DOCUMENTS 6,687,878 B1 *  2/2004  Eintracht ................ H04L 51/16
                                              715/201
2003/0081000 A1    5/2003  Watanabe et al.
2005/0275716 A1 * 12/2005  Shingu ................. G06F 16/743
                                              348/14.13

(Continued)

FOREIGN PATENT DOCUMENTS

JP    2003150542 A    5/2003
JP    2005-352933 A   12/2005

(Continued)

OTHER PUBLICATIONS

Jul. 13, 2021 Office Action issued in Japanese Patent Application No. 2017-207555.

(Continued)

*Primary Examiner* — Quoc A Tran
(74) *Attorney, Agent, or Firm* — Oliff PLC

(57) ABSTRACT

An information processing apparatus includes a converter that converts a time of execution of an operation on an additional object added to a document in a first place on a basis of the first place that is a place of execution of the operation on the additional object and a second place where the document is displayed; and a display controller that causes information indicative of a converted time to be displayed on a display in association with the additional object.

15 Claims, 11 Drawing Sheets

(56) References Cited

U.S. PATENT DOCUMENTS

| | | | |
|---|---|---|---|
| 2005/0289453 A1* | 12/2005 | Segal | G06F 1/12 |
| | | | 715/203 |
| 2006/0005117 A1* | 1/2006 | Yamashita | G06F 40/169 |
| | | | 715/205 |
| 2015/0207948 A1* | 7/2015 | Yamaguchi | H04N 1/00374 |
| | | | 358/452 |
| 2015/0347125 A1* | 12/2015 | High | G06F 3/04842 |
| | | | 717/101 |
| 2016/0155141 A1* | 6/2016 | Song | G06Q 30/0242 |
| | | | 705/14.41 |
| 2019/0089782 A1* | 3/2019 | Jiang | H04L 9/3297 |

FOREIGN PATENT DOCUMENTS

| | | |
|---|---|---|
| JP | 2009-053785 A | 3/2009 |
| JP | 2010-191495 A | 9/2010 |

OTHER PUBLICATIONS

Nov. 1, 2015, Tanaka & Masaya & Co., First Edition, Inc., pp. 226-229, Word 2016 Windows 10/8.1/7.

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-207555 filed Oct. 26, 2017.

BACKGROUND

(i) Technical Field

The present invention relates to an information processing apparatus and a non-transitory computer readable medium.

(ii) Related Art

Additional data (hereinafter referred to as an "additional object") is sometimes added to document data (hereinafter referred to as a "document"). The additional object functions, for example, as a note for adding comment or the like to the document. For example, in a case where an additional object is added to a document (for example, in a case where an additional object is placed on a document determinately), information indicative of a time of addition of the additional object to the document is sometimes displayed in association with the additional object.

SUMMARY

According to an aspect of the invention, there is provided an information processing apparatus including a converter that converts a time of execution of an operation on an additional object added to a document in a first place on a basis of the first place that is a place of execution of the operation on the additional object and a second place where the document is displayed; and a display controller that causes information indicative of a converted time to be displayed on a display in association with the additional object.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
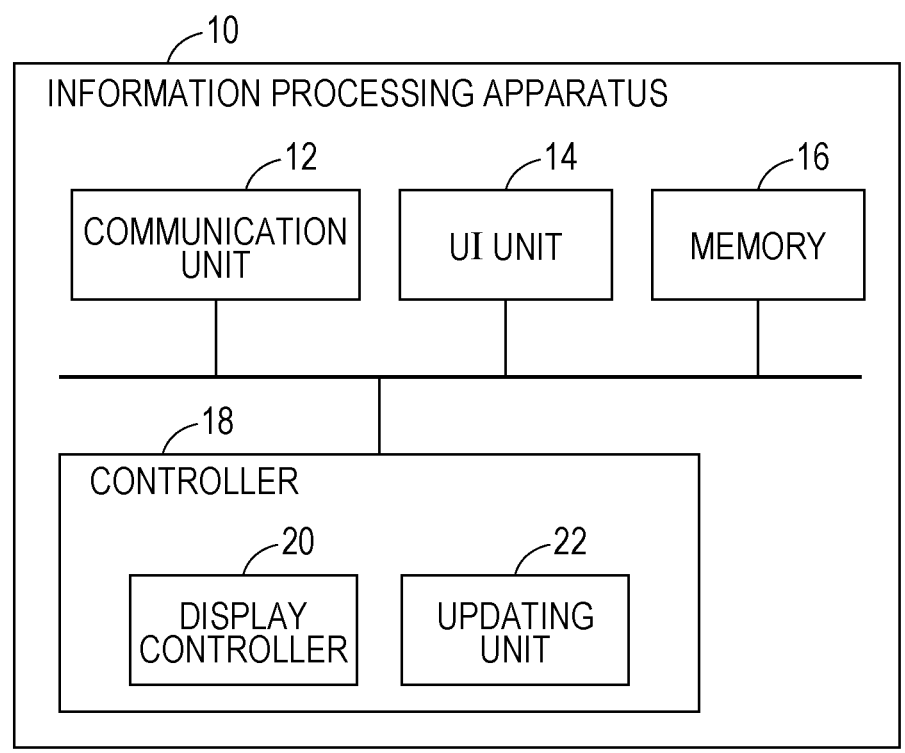
FIG. 1 is a block diagram illustrating a configuration of an information processing apparatus according to a first exemplary embodiment of the present invention.

An information processing apparatus according to a first exemplary embodiment of the present invention is described with reference to FIG. 1. FIG. 1 illustrates an example of the information processing apparatus according to the first exemplary embodiment.

An information processing apparatus 10 according to the first exemplary embodiment is an apparatus such as a personal computer (PC), a tablet PC, a smartphone, or a mobile phone and has functions such as management and edit of a document (document data). The information processing apparatus 10 may be configured not to have the functions such as management and edit of a document, and such functions may be offered to the information processing apparatus 10 from an external apparatus such as a server through a communication path such as the Internet. The configuration of the information processing apparatus 10 is described in detail below.

A communication unit 12 is a communication interface and has a function of transmitting data to another apparatus and a function of receiving data from another apparatus. The communication unit 12 may be a communication interface having a wireless communication function or may be a communication interface having a wired communication function. The information processing apparatus 10 may be configured not to have the communication unit 12.

A UI unit 14 is a user interface and includes a display and an operation unit. The display is a display device such as a liquid crystal display. The operation unit is, for example, an input device such as a keyboard, a mouse, or a touch panel. Needless to say, a user interface (e.g., a touch panel) that functions as both a display and an operation unit may be used. The UI unit 14 may include a sound collecting unit such as a microphone and a sound generating unit such as a speaker. In this case, audio information may be entered into the information processing apparatus 10, and audio information may be emitted.

A memory 16 is a storage device such as a hard disk or a memory. The memory 16 stores therein, for example, various kinds of data (e.g., document data and image data), various kinds of programs (e.g., an operating system (OS) and various application programs (application software)). For example, a document management software is stored in the memory 16, and management, edit, or the like of document data is performed through execution of the document management software. Pieces of information may be stored in different storage devices or may be stored in a single storage device. Document data processed by the document management software may be stored not in the memory 16 but in an external apparatus such as a server or another information processing apparatus. Document data stored in the external apparatus may be transmitted from the external apparatus to the information processing apparatus 10, and the document data may be displayed and edited on the information processing apparatus 10. Needless to say, document data stored in the memory 16 of the information processing apparatus 10 may be transmitted to the external apparatus, and the document data may be displayed and edited on the external apparatus.

A controller 18 has a function of controlling operation of each unit of the information processing apparatus 10. For example, the controller 18 controls communication of the communication unit 12, writing of information into the memory 16, and reading of information from the memory 16 and executes a program. The controller 18 includes a display controller 20 and an updating unit 22.

The display controller 20 has a function of controlling display of various kinds of information on the display of the UI unit 14. For example, the display controller 20 causes a document to be displayed on the display. An additional object (additional data) is sometimes added to the document displayed on the display. The additional object is, for example, information that functions as a note for adding comment or the like to a document, a character string, a figure, or the like and can be called an annotation added to a document. For example, in a case where an additional object is selected by a user, the display controller 20 causes information (date and time information indicative of a date and a time) indicative of a time of the selection of the additional object to be displayed on the display in association with the additional object. For example, the controller 18 has a time measuring function, and a time (e.g., a date and a time) is measured by the controller 18.

The updating unit 22 has a function of updating the time of the selection of the additional object to a time of confirmation of the additional object in a case where the additional object is confirmed after the selection of the additional object by the user. The display controller 20 causes information indicative of the updated time to be displayed on the display in association with the additional object.

The information processing apparatus 10 according to the first exemplary embodiment is described in more detail below.

Figure 2:
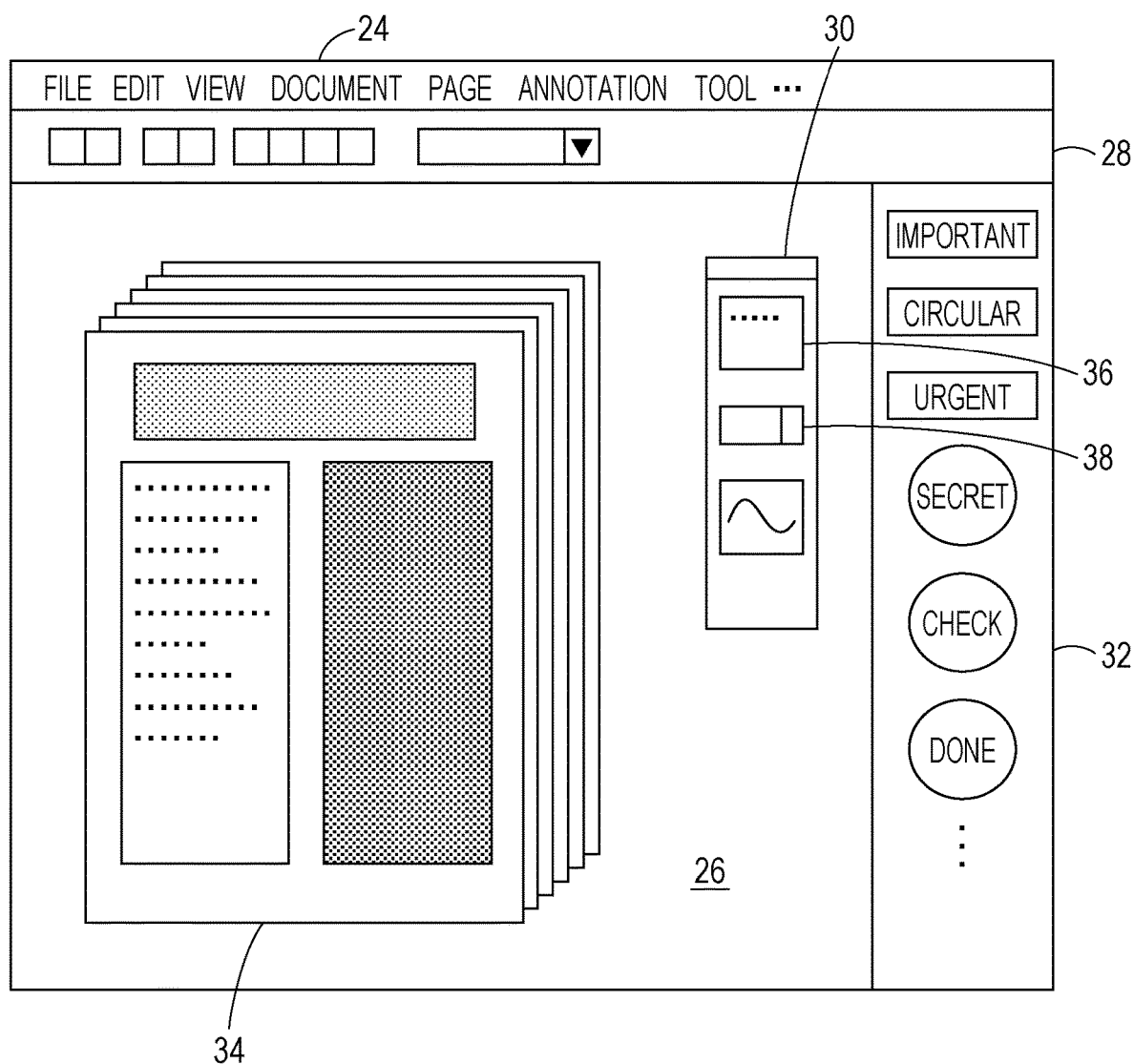
FIG. 2 illustrates an example of a screen.

FIG. 2 illustrates an example of a screen displayed on the display of the UI unit 14. For example, in a case where the document management software is activated, the display controller 20 causes a screen 24 for display, edit, and the like of a document using the document management software to be displayed on the display of the UI unit 14.

The screen 24 has, for example, a display region 26, a menu bar 28, and annotation bars 30 and 32. The configuration of the screen 24 is merely an example, and the screen 24 may have another configuration.

The display region 26 is a region in which a document is displayed. In the example illustrated in FIG. 2, a document 34 is displayed in the display region 26. For example, in a case where a document to be displayed is designated by user's operation of the UI unit 14, the display controller 20 causes the document designated by the user to be displayed within the display region 26. The document may be stored in the information processing apparatus 10 or may be stored in the external apparatus.

The menu bar 28 is a region in which information (e.g., an icon, an image, or a character string) for execution of various functions of the document management software is displayed. The controller 18 may register information such as an icon in the menu bar 28 or may delete information such as an icon from the menu bar 28 upon user's operation.

The annotation bars 30 and 32 are regions where an additional object (annotation) or information (e.g., an icon, an image, or a character string) for execution of a function for adding an additional object is displayed. Specifically, notes 36 and 38 that are additional objects and other additional objects (e.g., images) are displayed on the annotation bar 30. The note 36 is an image having a region where information is to be added by a user. For example, a character string may be entered in the note 36 by the user or another image may be superimposed on the note 36 by the user. The note 36 is an image with which time information (e.g., date and time information indicative of a date and a time) is associated. For example, date and time information is displayed within the note 36. The note 38 is an image that does not have a region where information is to be added by the user.

The annotation bar 32 is a region where an image representing a stamp that is an additional object is displayed. For example, images representing character strings such as "IMPORTANT", "CIRCULATE", and "URGENT" are displayed on the annotation bar 32.

When the user performs an operation of selecting an additional object displayed within the annotation bar 30 or 32 and extracting the additional object from the annotation bar 30 or 32 by using the UI unit 14, the display controller 20 extracts the additional object designated by the user from the annotation bar 30 or 32 in accordance with the operation and causes the additional object to be displayed within the display region 26. When the user performs an operation of moving the additional object by using the UI unit 14, the display controller 20 moves the additional object within the display region 26 in accordance with the operation. When the user performs an operation of confirming a position of the additional object by using the UI unit 14, the display controller 20 disposed the additional object at the position designated by the user in accordance with the operation. In this way, the additional object is pasted onto the document determinately. That is, the additional object is disposed at the position and this state is maintained unless the user selects and operates the additional object again.

The controller 18 may register an additional object in the annotation bar 30 or 32 or may delete an additional object from the annotation bar 30 or 32 upon user's operation. For example, an image representing a stamp may be superimposed onto the note 36 by user's operation, and an additional object thus obtained may be added to the annotation bar 30 or 32. In this case, when this additional object is selected and disposed on the document 34 by the user, the note 36 on which the image representing the stamp is superimposed is disposed on the document 34.

Hereinafter, operation of the information processing apparatus 10 according to the first exemplary embodiment is described in detail. In the following description, it is assumed that the note 36 that is an additional object is operated by the user.

Figure 3:
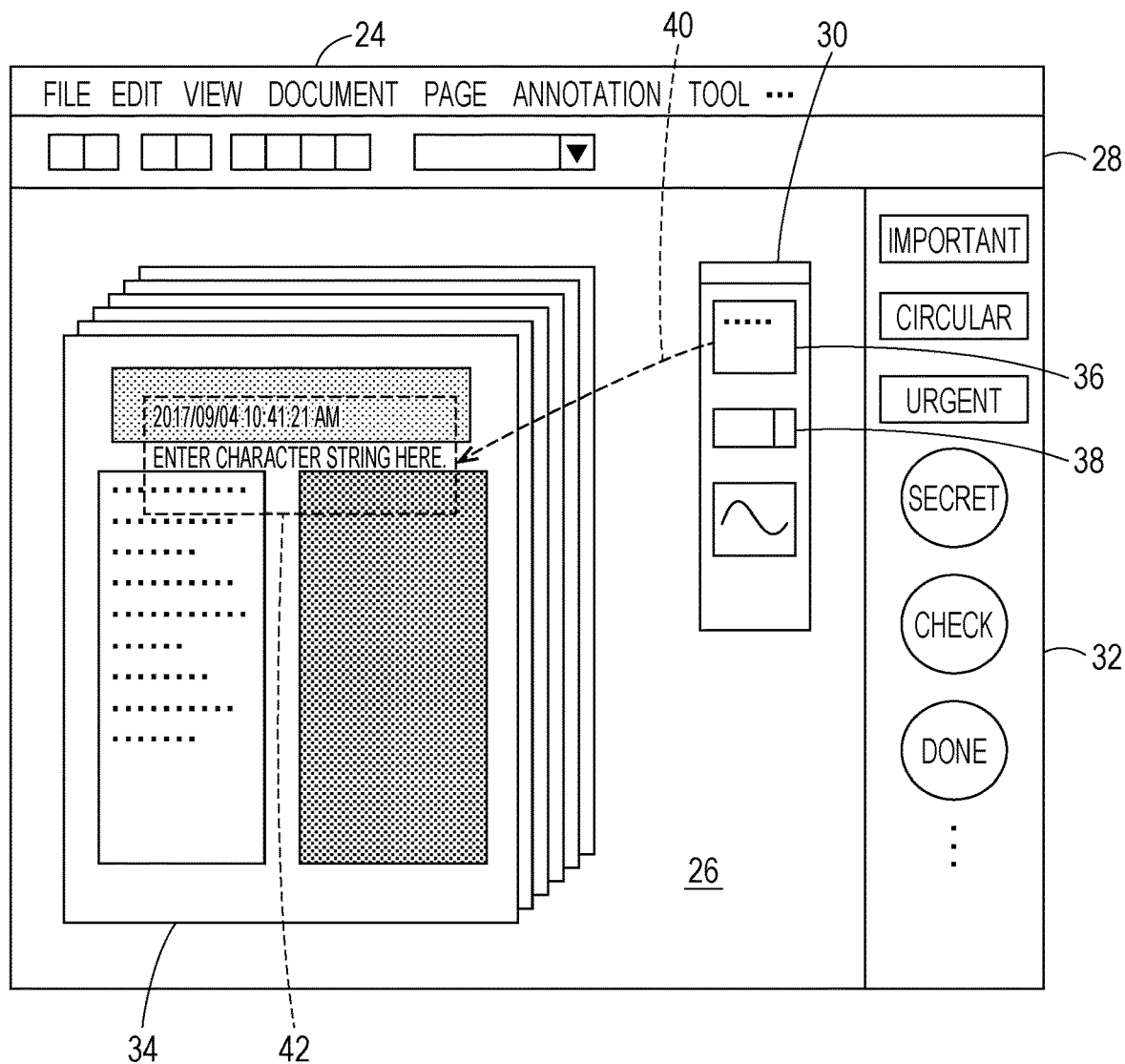
FIG. 3 illustrates an example of a screen.

FIG. 3 illustrates the screen 24. For example, in a case where a user performs an operation of selecting the note 36 displayed within the annotation bar 30 and extracting the note 36 from the annotation bar 30 as indicated by the arrow 40 by using the UI unit 14, the display controller 20 extracts the note 36 from the annotation bar 30 in accordance with the operation and causes the note 36 to be displayed within the display region 26. A note 42 is an image thus extracted. In the example illustrated in FIG. 3, the note 42 is moved onto the document 34 by a user's operation, and the note 42 is displayed at the position to which the note 42 has been moved. For example, when the user selects the note 36 by using a mouse and operates the mouse, the note 42 is displayed on the document 34. In a case where a touch panel type display is used, the selecting and moving operation may be performed by an operation made on the screen 24.

Alternatively, the above operation may be performed by voice. The display controller 20 may control a display state of the note 42 so that the user can recognize that the position of the note 42 has not been confirmed and that the note 42 can be moved by the user until the user performs an operation of confirming the note 42 (an operation of pasting the note 42 onto the document 34). In the example illustrated in FIG. 3, the display controller 20 causes the note 42 to be displayed in a semi-transparent state within the display region 26. The semi-transparent display state gives an impression as if an afterimage of the note 42 is displayed and is therefore also called a ghost display state. Needless to say, the display controller 20 may cause the note 42 to be displayed not in a semi-transparent state but in a non-transparent state within the display region 26. Alternatively, the display controller 20 may cause the note 42 to blink on and off or may cause an edge of the note 42 to be displayed in a specific color.

The operation of confirming the note 42 (the operation of pasting the note 42 onto the document 34) is, for example, an operation of clicking a mouse in a case where a mouse is used as the operation unit, an operation of detaching an indicator such as a user's finger or a stylus from the screen 24 in a case where a touch panel is used, or a spoken confirming command in a case where voice recognition is used. The operation of confirming the note 42 may be determined in advance or may be changed by the user.

Figure 4:
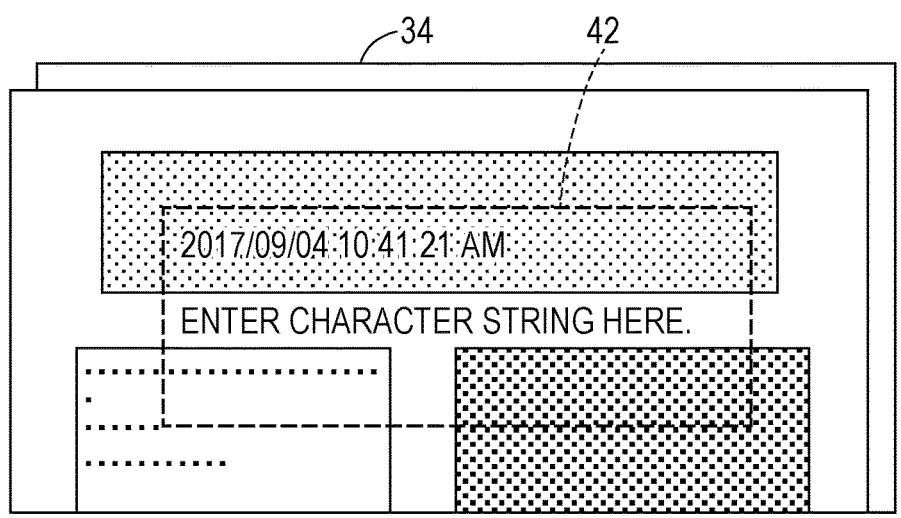
FIG. 4 is an enlarged view of a document and a note.

The note 42 that has not been confirmed, i.e., the note 42 that has not been pasted onto the document 34 is described in detail below with reference to FIG. 4. FIG. 4 is an enlarged view of part of the document 34 and the note 42 illustrated in FIG. 3. The note 42 is an image with which date and time information is associated, and the date and time information is displayed within the note 42. The display controller 20 causes information indicative of a date and a time of user's selection of the note 36 within the annotation bar 30 to be displayed within the note 42. In the example illustrated in FIG. 4, a character string "2017/09/04 10:41:21 AM" is displayed within the note 42. This indicates that the note 36 was selected on this date and time by the user within the annotation bar 30. By displaying such information, the date and time of user's selection of the note 36 is presented to the user.

Figure 5:
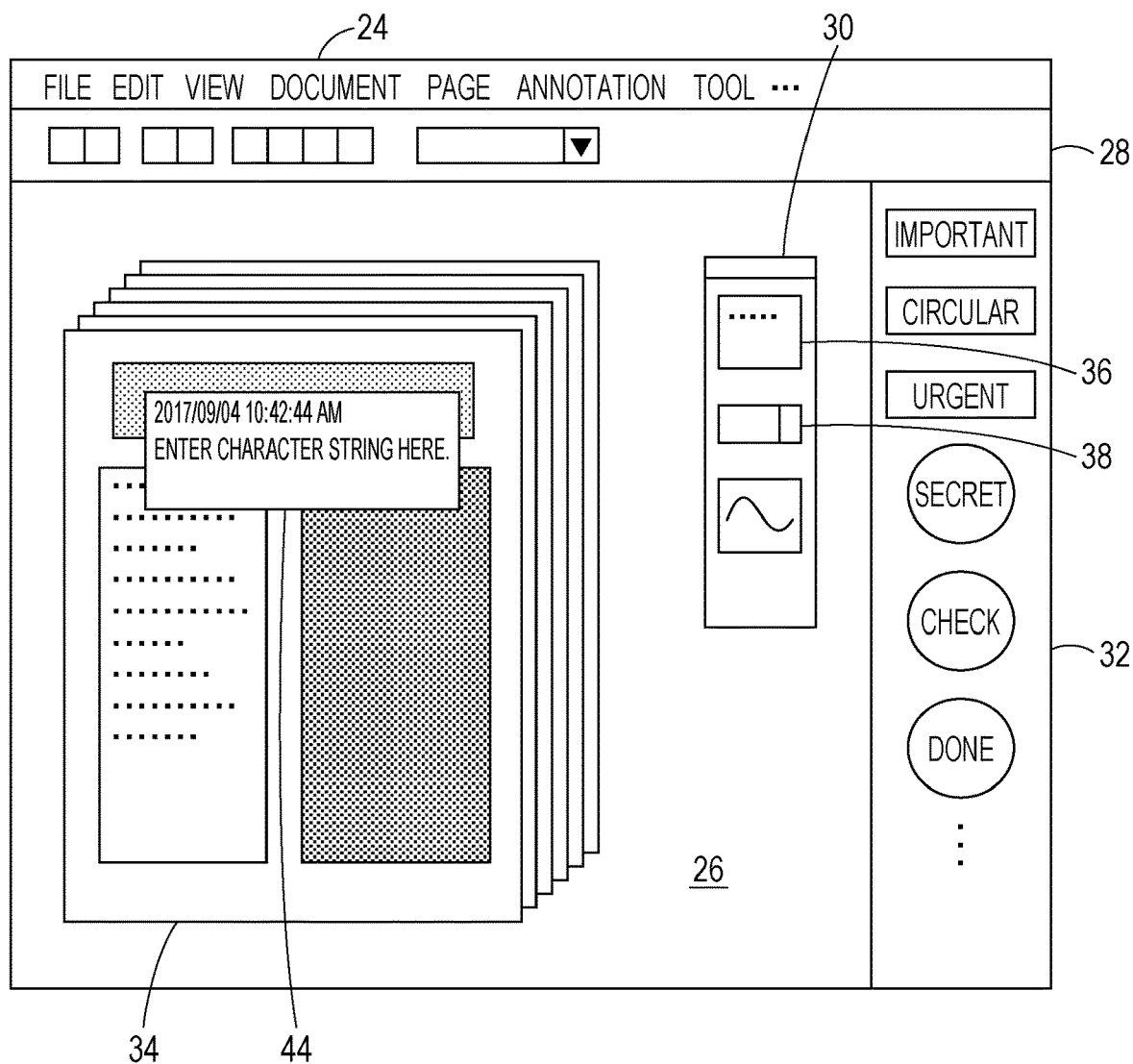
FIG. 5 illustrates an example of a screen.

A case where the confirming operation has been performed is described with reference to FIG. 5. FIG. 5 illustrates the screen 24. In a case where the user performs the confirming operation (the operation of pasting the note 42 onto the document 34) on the note 42 in the ghost display state (the note 42 that has not been confirmed), the display controller 20 causes a confirmed note 44 (a note obtained after the operation of confirming the note 42) to be displayed within the display region 26 as illustrated in FIG. 5. In this way, the note 44 is pasted onto the document 34 determinately. That is, the note 44 is disposed at the position and this state is maintained unless the user selects and operates (e.g., moves) the note 44 again. For example, the display controller 20 causes the note 44 to be displayed in a non-transparent state within the display region 26. Needless to say, the display controller 20 may cause the note 44 to be displayed in a semi-transparent state within the display region 26 on the basis of a user's command or setting.

The document 34 includes one or more pages. The note 42 may be moved within the same page or the note 42 displayed on one page may be moved to another page and displayed on the other page. In a case where the confirming operation is performed on the page to which the note 42 has been moved, the note 44 is pasted onto this page.

Figure 6:
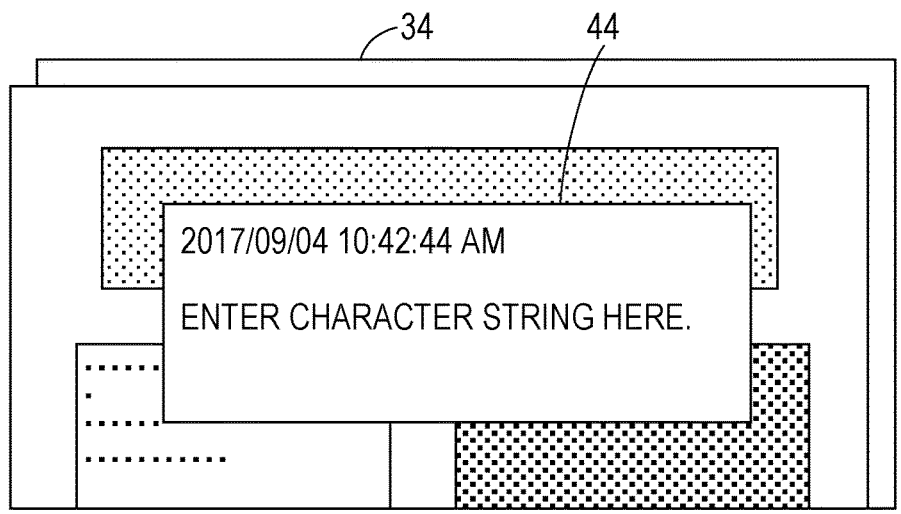
FIG. 6 is an enlarged view of a document and a note.

The note 44 that has been confirmed, i.e., the note 44 that has been pasted on the document 34 is described in detail below with reference to FIG. 6. FIG. 6 is an enlarged view of part of the document 34 and the note 44 illustrated in FIG. 5. Information (e.g., a character string, an image, or another additional object) is added to a region within the note 44. Before the information is added to the region within the note 44, for example, a character string "ENTER CHARACTER STRING HERE." is displayed within the note 44. Such a character string may be displayed within the note 42 that has not been confirmed. The user edits the confirmed note 44 by operating the UI unit 14 after the note 44 is confirmed (after the note 44 is pasted onto the document 34). The controller 18 edits the note 44 upon receipt of the user's editing operation. For example, a character string is entered into the note 44, the character string is edited, the character string is deleted, an image is added, an image is deleted, another additional object (annotation) is added, or another additional object is deleted.

The note 44 is an image with which date and time information is associated, and the date and time information is displayed within the note 44. In a case where the note 42 that has not been confirmed is confirmed, the updating unit 22 updates the date and time information displayed within the note 42 to information indicative of a date and a time of execution of the confirming operation. The display controller 20 causes the updated date and time information (the information indicative of the date and time of execution of the confirming operation) to be displayed within the note 44 that has been confirmed. In the example illustrated in FIG. 6, a character string "2017/09/04 10:42:44 AM" is displayed within the note 44. This indicates that the note 42 was confirmed on this date and time. By thus updating the date and time information, the date and time of execution of the operation of confirming the note 42, i.e., the date and time of execution of the operation of pasting the note 42 (note 44) onto the document 34 are presented to the user.

As described above, according to the first exemplary embodiment, a date and a time of execution of an operation of a note is presented to the user.

For example, a date and a time of selection of the note 36 within the annotation bar 30 are displayed, and thus the date and time of the selecting operation are presented to the user. In this way, the user who has selected the note 36 is less likely to have an impression that the note is added to a document while information (past date and time information) indicative of a date and a time of past selection of the note is kept without being updated.

Furthermore, a date and a time of execution of a confirming operation are displayed, and thus the date and time of execution of the confirming operation are presented to the user. This corrects a time difference between a time of execution of an operation of selecting the note 36 and a time of execution of the confirming operation, and thus the date and time of actual execution of the confirming operation are presented to the user. Furthermore, the date and time of execution of the confirming operation are recorded on the note 44. For example, a time difference (time lag) between the time of execution of the operation of selecting the note 36 and the time of execution of the confirming operation becomes larger as a period from the time of execution of the operation of selecting the note 36 to the time of execution of the confirming operation becomes longer. It is assumed that such a situation occurs in a case where the user is hesitating where to paste a note. According to the first exemplary embodiment, the time difference is eliminated even in such a case, and the date and time of actual execution of the confirming operation are displayed within the note 44 that has been confirmed.

The updating unit 22 may update a date and a time displayed within the note 42 that has not been confirmed to current date and time in accordance with elapse of time during a period from selection of the note 36 on the annotation bar 30 to execution of a confirming operation. That is, the updating unit 22 may update a date and a time even while the note 42 is in a ghost display state. The display controller 20 causes information indicative of a date and a time (current date and time) that have been updated by the updating unit 22 to be displayed within the note 42. In this way, the user is less likely to have an impression that a note is added to a document while information indicative of a date and a time of selection of the note 36 is kept without being updated.

Needless to say, the updating unit 22 may keep information indicative of a date and a time of selection of the note 36 on the annotation bar 30 without updating the date and time during a ghost display state.

Figure 7:
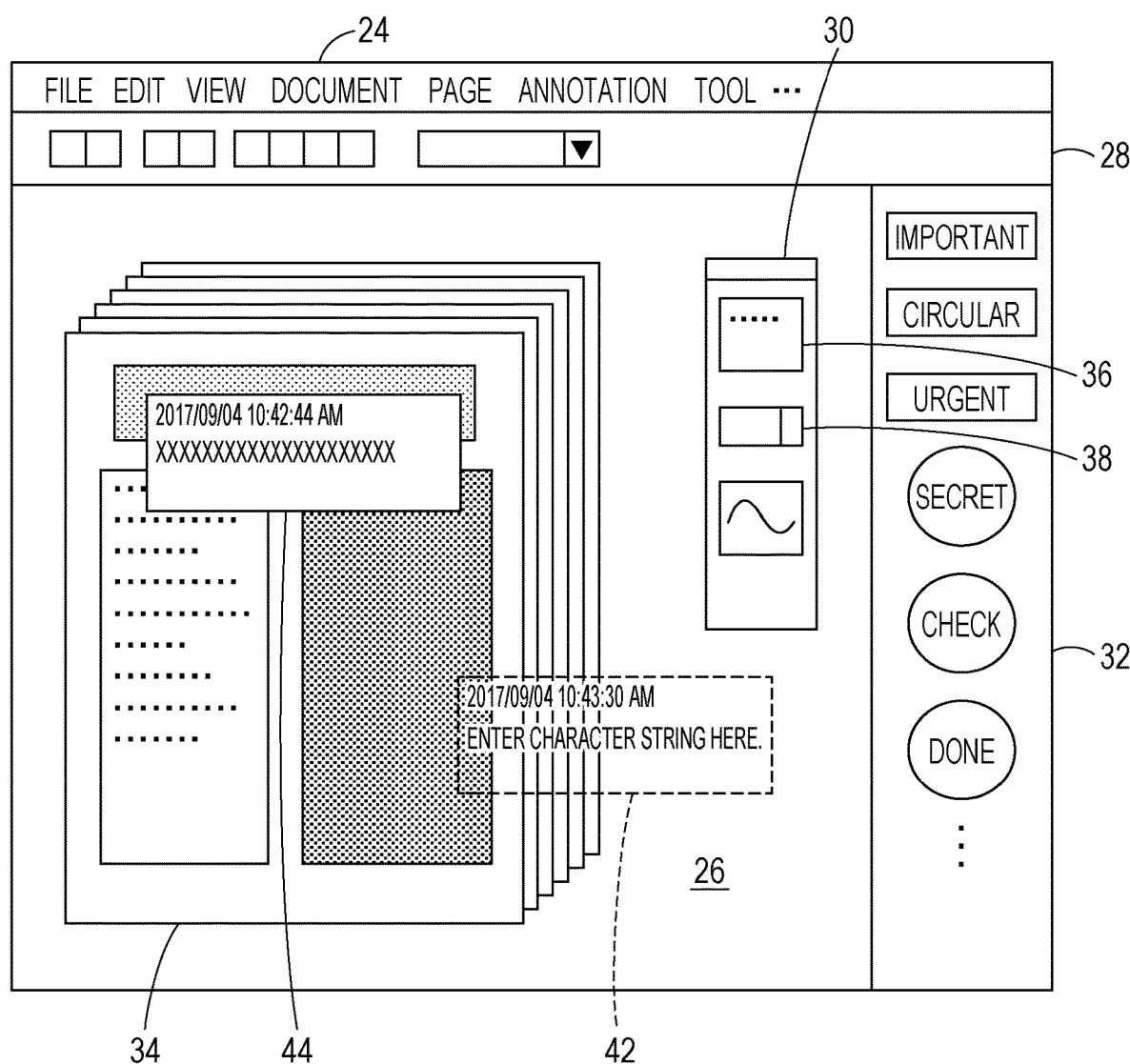
FIG. 7 illustrates an example of a screen.

Notes may be successively pasted onto the document 34. This process (successive pasting process) is described in detail below with reference to FIG. 7. FIG. 7 illustrates the screen 24. In a case where the user gives a command to execute a note successive pasting function by using the UI unit 14, the controller 18 executes the successive pasting function. For example, the note 36 is selected from the annotation bar 30, and the note 44 is confirmed and pasted onto the document 34. Then, the controller 18 edits the note 44 upon receipt of a user's operation of editing the note 44. Even during execution of the successive pasting function, the display controller 20 causes information indicative of a date and a time of selection of the note 36 on the annotation bar 30 to be displayed within the note 42 in a ghost display state. In a case where the note 42 is confirmed, the updating unit 22 updates the date and time information to information indicative of a date and a time of execution of the confirming operation, and the display controller 20 causes the updated date and time information to be displayed within the note 44 that has been confirmed. During execution of the successive pasting function, the display controller 20 causes a new note 42 that has not been confirmed to be displayed on the screen 24 after the note 44 is pasted onto the document 34. That is, during execution of the successive pasting function, the note 36 within the annotation bar 30 is continuously selected, and the display controller 20 causes a next note 42 to be displayed within the display region 26 after a note 44 is confirmed. The next note 42 is displayed in a ghost display state and is moved within the display region 26 by a user's operation. In a case where the next note 42 is confirmed, a new note 44 that has been confirmed is displayed at a position where the confirming operation was executed. In this case, the updating unit 22 updates date and time information to information indicative of a date and a time of execution of the confirming operation, and the display controller 20 causes the updated date and time information to be displayed within the new note 44. The display controller 20 causes a new note 42 to be displayed within the display region 26 until the successive pasting function is deactivated in accordance with a user's command.

Even during execution of the successive pasting function, a date and a time of execution of a confirming operation is specified for each note 42, and information indicative of the date and time of actual execution of the confirming operation is displayed within each note 44, as described above. As a larger number of notes are successively pasted by execution of the successive pasting function, a time difference (time lag) from a time of execution of an operation of selecting the note 36 on the annotation bar 30 to a time of execution of an operation of confirming a latest note 42 becomes larger. According to the first exemplary embodiment, information indicative of date and time of actual execution of a confirming operation is displayed within each note 44, and therefore the time difference is eliminated in each note 44.

During execution of the successive pasting function, the updating unit 22 may update a date and a time displayed within a note 42 that has not been confirmed (a note 42 in a ghost display state) to current date and time in accordance with elapse of time. The display controller 20 causes information indicative of the date and a time (current date and time) updated by the updating unit 22 to be displayed within the note 42 in a ghost display state. In the example illustrated in FIG. 7, information indicative of a date and a time of execution of an operation of confirming a note 44 is displayed within the note 44, and information indicative of current date and time is displayed within a note 42. In this way, the user is less likely to have an impression that a note is added to a document while information indicative of a date and a time of selection of the note 36 is kept without being updated.

Needless to say, the updating unit 22 may keep a date and a time of selection of the note 36 on the annotation bar 30 without updating the date and time in a ghost display state.

A date and a time displayed within a note may be current date and time (e.g., a date and a time expressed by the Western calendar or a name of an era) or may be a period elapsed (a date and a time elapsed) from a predetermined reference time. For example, in a case where 0:0:0 on Jan. 1, 2000 is determined as the reference time, a difference between the reference time and current date and time is displayed as the elapsed period. The reference time may be changed by the user. Either the current date and time or the elapsed period may be selected by the user as a date and a time displayed within a note.

A time displayed within a note may be a date and a time, may be only a date, may be only a time, or may include a day of the week.

Date and time information (date and time information of a selecting operation or date and time information of a confirming operation) associated with a note may be displayed outside the note in association with the note instead of being displayed within the note. The same applies to the second and third exemplary embodiments below.

Second Exemplary Embodiment

A second exemplary embodiment of the present invention is described below. An information processing apparatus according to the second exemplary embodiment has a configuration identical to the information processing apparatus 10 according to the first exemplary embodiment. In the second exemplary embodiment, in a case where a first operation is performed on an additional object (e.g., a note) added to a document, a display controller 20 causes information indicative of a time of execution of the first operation to be displayed on a display in association with the additional object. Meanwhile, in a case where a second operation is performed on the additional object, the display controller 20 does not cause information indicative of a time of execution of the second operation to be displayed on the display. The second exemplary embodiment is described below in detail.

In a case where the first operation is performed on a note that has been confirmed (e.g., a note 44 illustrated in FIG. 7) by a user, an updating unit 22 updates date and time information associated with the note to information indicative of a date and a time of execution of the first operation. That is, the updating unit 22 updates a date and a time of execution of the operation of confirming the note to the date and time of execution of the first operation on the note. The display controller 20 causes the updated date and time information to be displayed on the display in association with the note. The date and time of execution of the first operation may be a date and a time of start of the first operation or may be a date and a time of end of the first operation.

Meanwhile, in a case where a second operation is performed on a note that has been confirmed (e.g., a note 44) by a user, the updating unit 22 keeps date and time information associated with the note without updating the date and time information. The display controller 20 causes information indicative of a date and a time of execution of the confirming operation to be displayed on the display in association with the note.

The first operation is, for example, an operation that involves change of display contents within a note. Specifically, the first operation is edit of part or all of a character string (text) displayed within a note, addition or deletion of another additional object (annotation) to or from the note, change of a font of the character string, change of a character size of the character string, deletion of all of the character string, or the like.

The second operation is, for example, an operation that does not involve change of display contents within a note. Specifically, the second operation is an operation that involves change of at least one of a position, a shape, a size, and a color of a note on a document.

The second exemplary embodiment is described in more detail below by using a specific example.

Figure 8:
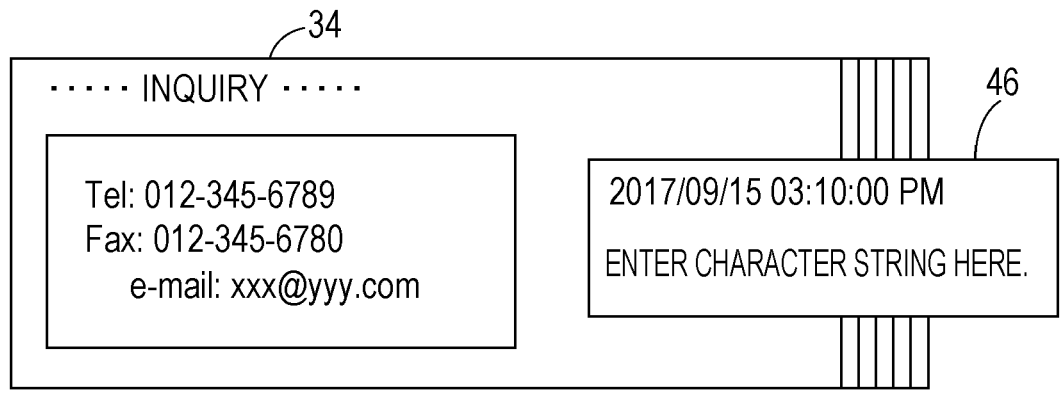
FIG. 8 is an enlarged view of a document and a note.

FIG. 8 illustrates part of a document 34 and a note 46 displayed on a screen 24. The note 46 is a note that has been confirmed by a user and is pasted on the document 34. As in the first exemplary embodiment, information indicative of a date and a time of execution of the confirming operation is displayed within the note 46. In the example illustrated in FIG. 8, a character string "2017/09/15 03:10:00 PM" is displayed as date and time information within the note 46. This indicates that the note 46 was confirmed and pasted onto the document 34 on this date and time.

Figure 9:
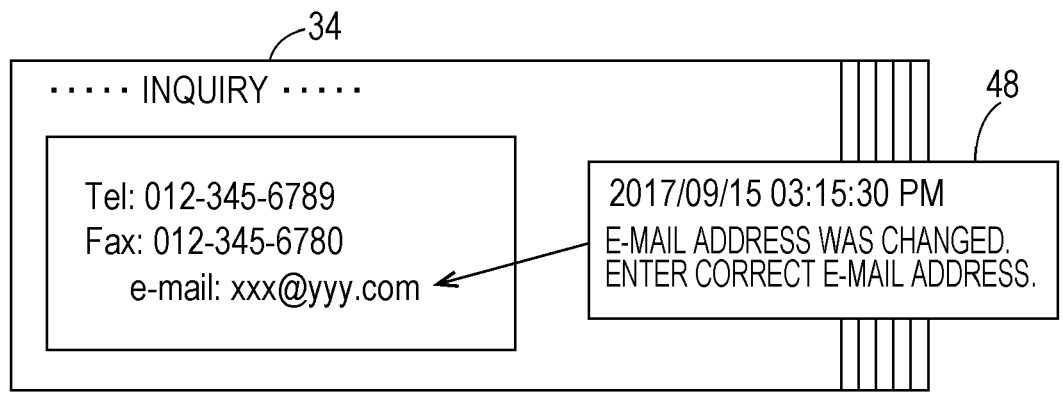
FIG. 9 is an enlarged view of a document and a note.

FIG. 9 illustrates part of the document 34 and a note 48. The note 48 is a note obtained after a user writes a character string into the note 46 illustrated in FIG. 8. In the example illustrated in FIG. 9, a character string "E-MAIL ADDRESS WAS CHANGED. ENTER CORRECT E-MAIL ADDRESS." is written by the user, and this character string is displayed within the note 48. This writing operation involves change of display contents within the note and is therefore the first operation. Therefore, the updating unit 22 updates date and time information displayed within the note 46 before execution of the first operation to information indicative of a date and a time of execution of the writing operation. The display controller 20 causes the updated date and time information to be displayed within the note 48 on which the first operation has been performed. For example, in a case where the date and time of execution of the writing operation is 3:15:30 PM on Sep. 15, 2017, the character string "2017/09/15 03:10:00 PM" indicative of the date and time of execution of the confirming operation is updated to a character string "2017/09/15 03:15:30 PM" indicative of the date and time of execution of the writing operation, and the character string indicative of the updated date and time is displayed within the note 48. The date and time of execution of the writing operation may be a date and a time of start of the writing operation or may be a date and a time of end of the writing operation.

Figure 10:
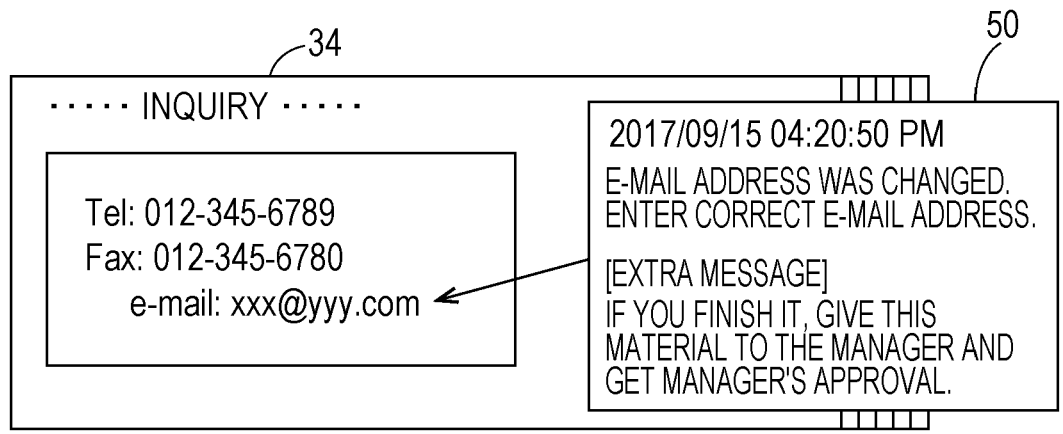
FIG. 10 is an enlarged view of a document and a note.

FIG. 10 illustrates part of the document 34 and a note 50. The note 50 is a note obtained after the user adds a character string to the note 48 illustrated in FIG. 9. In the example illustrated in FIG. 10, a character string "IF YOU FINISH IT, GIVE THIS MATERIAL TO THE MANAGER AND GET MANAGER'S APPROVAL." is written by the user as an extra message in addition to the character string written into the note 48 illustrated in FIG. 9, and this character string is displayed within the note 50. This extra message writing operation is an operation that involves change of display contents within the note and is therefore the first operation. Therefore, the updating unit 22 updates the date and time information displayed within the note 48 before execution of the extra message writing operation to information indicative of a date and a time of execution of the extra message writing operation. The display controller 20 causes the updated date and time information to be displayed within the note 50 obtained after the extra message writing operation. For example, in a case where the date and time of execution of the extra message writing operation is 4:20:50 PM on Sep. 15, 2017, the character string "2017/09/15 03:15:30 PM" indicative of the date and time of execution of the writing operation is updated to a character string "2017/09/15 04:20:50 PM" indicative of the date and time of execution of the extra message writing operation, and the character string indicative of the updated date and time is displayed within the note 50.

Figure 11:
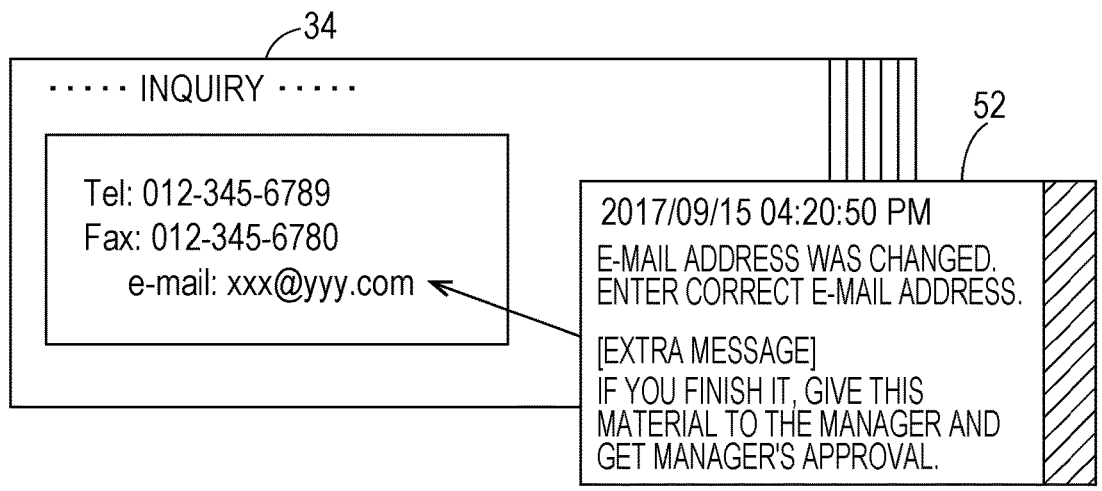
FIG. 11 is an enlarged view of a document and a note.

FIG. 11 illustrates part of the document 34 and a note 52. The note 52 is a note obtained after the user performs the second operation on the note 50 illustrated in FIG. 10. In the example illustrated in FIG. 11, a shape, a color, and a position of the note 50 illustrated in FIG. 10 have been changed, and the changed note 52 is pasted onto the document 34. This changing operation is not an operation that involves change of display contents within the note and is therefore the second operation. Therefore, the updating unit 22 does not update the date and time information displayed within the note 50 before the change. The display controller 20 causes the date and time information displayed within the note 50 to be displayed within the note 52 obtained after the changing operation.

As described above, according to the second exemplary embodiment, display of time information associated with a note added to a document is controlled in accordance with a user's operation performed on the note.

For example, in a case where the first operation that involves change of display contents within a note is performed, date and time information displayed within the note is updated to information indicative of a date and a time of execution of the first operation, and thus a date and a time of change of display contents are presented to a user. This makes it easier for the user to understand when information within the note was changed than in a case where the date and time information is not updated even after the first operation. Even in a case where an operation is performed on a note but in a case where the operation is the second operation that does not involve change of display contents within the note, date and time information displayed within the note is not updated to information indicative of a date and a time of execution of the second operation. This makes it possible to prevent the date and time information from being updated even in a case where an operation that does not involve change of display contents is performed. Through the aforementioned control, in a case where display contents are changed, a date and a time of the change are recorded in a note, and in a case where display contents are not changed, date and time information is not updated. This is convenient, for example, in a case where a history of change of display contents is managed.

Figure 12:
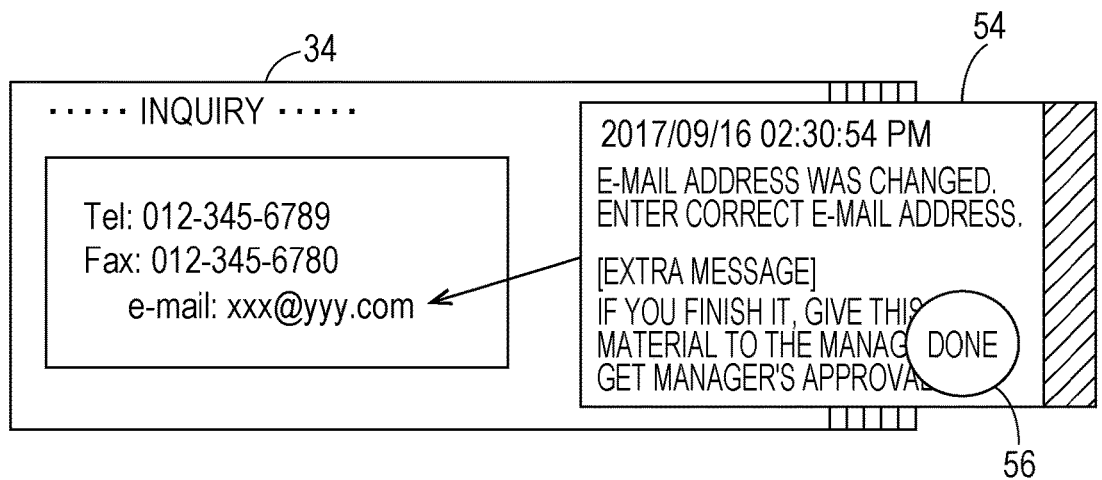
FIG. 12 is an enlarged view of a document and a note.

Another additional object (annotation) may be added onto a note. This process is described with reference to FIG. 12. FIG. 12 illustrates part of the document 34 and a note 54. The note 54 is a note obtained after a user adds another additional object to the note 52 illustrated in FIG. 11. In the example illustrated in FIG. 12, a stamp image (an image representing a character string "DONE") is added as another additional object by the user in addition to the character string written into the note 52, and the stamp image 56 is displayed within the note 54. This adding operation is an operation that involves change of display contents within the note and is therefore the first operation. Therefore, the updating unit 22 updates the date and time information displayed within the note 52 before the adding operation to information indicative of a date and a time of execution of the adding operation. The display controller 20 causes the updated date and time information to be displayed within the note 54 obtained after the adding operation. For example, in a case where the date and time of execution of the adding operation is 2:30:54 PM on Sep. 16, 2017, a character string "2017/09/15 04:20:50 PM" indicative of the data and time of execution of the extra message writing operation performed on the note is updated to a character string "2017/09/16 02:30:54 PM" indicative of the date and time of execution of the operation of adding the stamp 56, and the character string indicative of the updated date and time is displayed within the note 54.

Figure 13:
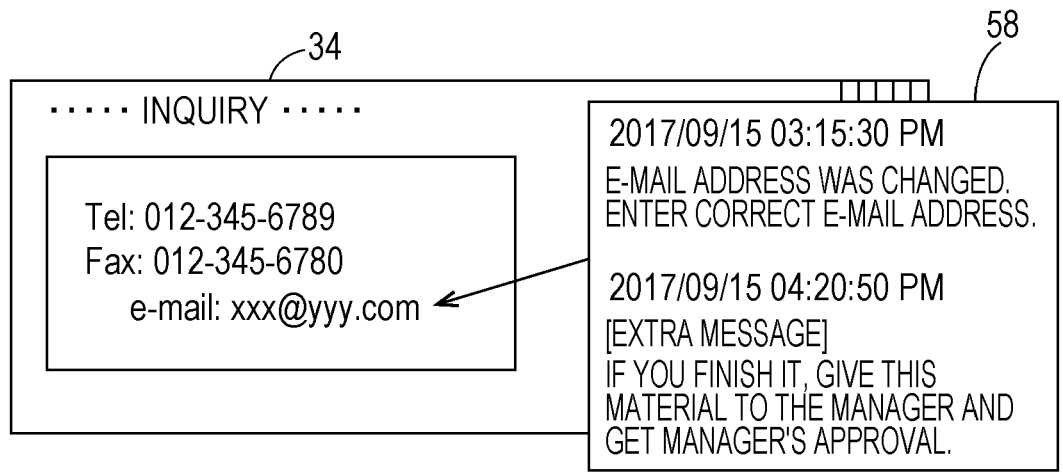
FIG. 13 is an enlarged view of a document and a note.

In a case where the first operation is performed on a note, the display controller 20 may cause information indicative of a date and a time of execution of the first operation to be additionally displayed within the note without changing date and time information displayed within the note. This process is described in detail below with reference to FIG. 13. FIG. 13 illustrates part of the document 34 and a note 58. The note 58 is a note obtained after a user adds a character string to the note 48 illustrated in FIG. 9. In the example illustrated in FIG. 13, a character string "IF YOU FINISH IT, GIVE THIS MATERIAL TO THE MANAGER AND GET MANAGER'S APPROVAL." is written by the user as an extra message in addition to the character string written into the note 48, and this character string is displayed within the note 58. This extra message writing operation is an operation that involves change of display contents within the note and is therefore the first operation. In this case, the updating unit 22 does not update the date and time information displayed within the note 48 to information indicative of a date and a time of execution of the extra message writing operation, and the display controller 20 causes the information indicative of the date and time of execution of the extra message writing operation to be additionally displayed within the note 58 obtained after the extra message writing operation. That is, the display controller 20 causes both of the information indicative of the date and time of execution of the writing operation before the extra message writing operation and the information indicative of the date and time of execution of the extra message writing operation to be displayed within the note 58.

For example, in a case where the date and time of execution of the extra message writing operation is 4:20:50 PM on Sep. 15, 2017, both of the character string "2017/09/15 03:15:30 PM" indicative of the date and time of execution of the writing operation and a character string "2017/09/15 04:20:50 PM" indicative of the date and time of execution of the extra message writing operation are displayed within the note 58. More specifically, every time the first operation is performed, information indicative of a date and a time of execution of the first operation is displayed in association with a character string added to a note by the first operation. For example, the character string "2017/09/15 03:15:30 PM" indicative of the date and time of addition of the character string "E-MAIL ADDRESS WAS CHANGED. ENTER CORRECT E-MAIL ADDRESS" is displayed in association with this character string. Similarly, the character string "2017/09/15 04:20:50 PM" indicative of the date and time of addition of the character string "IF YOU FINISH IT, GIVE THIS MATERIAL TO THE MANAGER AND GET MANAGER'S APPROVAL." is displayed in association with this character string.

As described above, by additionally displaying information indicative of a date and a time of execution of a new first operation within a note without updating date and time information, information indicative of a date and a time of each first operation is displayed.

In a case where a first operation is performed on a note, the updating unit 22 may cause information indicative of a date and a time of addition of the note to the document 34 and information indicative of a date and a time of execution of the first operation to be displayed within the note without updating the information indicative of the date and time of addition of the note to the document 34.

Figure 14:
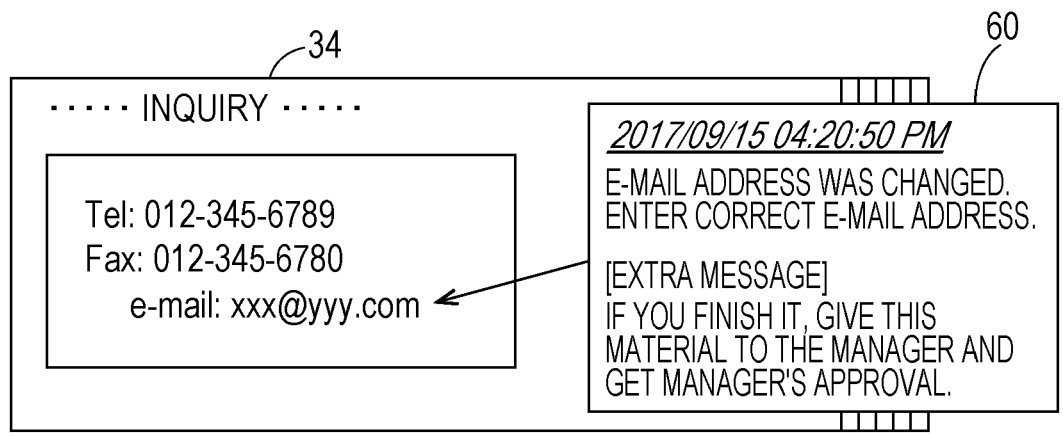
FIG. 14 is an enlarged view of a document and a note.

In a case where a first operation is performed on a note, the display controller 20 may cause information indicative of a date and a time of execution of the first operation to be displayed within the note in a manner distinguishable from another piece of information displayed within the note. This process is described in detail below with reference to FIG. 14. FIG. 14 illustrates part of the document 34 and a note 60. The note 60 is a note (a note obtained after the first operation) obtained after a user adds a character string to the note 48 illustrated in FIG. 9. Date and time information displayed within the note 60 is updated date and time information and indicates a time (a time of execution of the first operation) of addition of the character string to the note. For example, the display controller 20 may display the updated date and time information in a specific color (e.g., red), may display the updated date and time information by using a specific font, or may display the updated date and time information by using an italic type, an underline, or the like. This allows the user to recognize that the date and time information has been updated. The specific color, the specific font, and presence or absence of an italic type or an underline may be determined in advance or may be changed by the user. The display controller 20 may cause the updated date and time information to be displayed within the note in a display form (e.g., a display color, a font type, or presence or absence of an italic type or an underline) different from the date and time information displayed before the update. For example, the display controller 20 may change a display form of date and time information every time a first operation is performed on the note.

Figure 15:
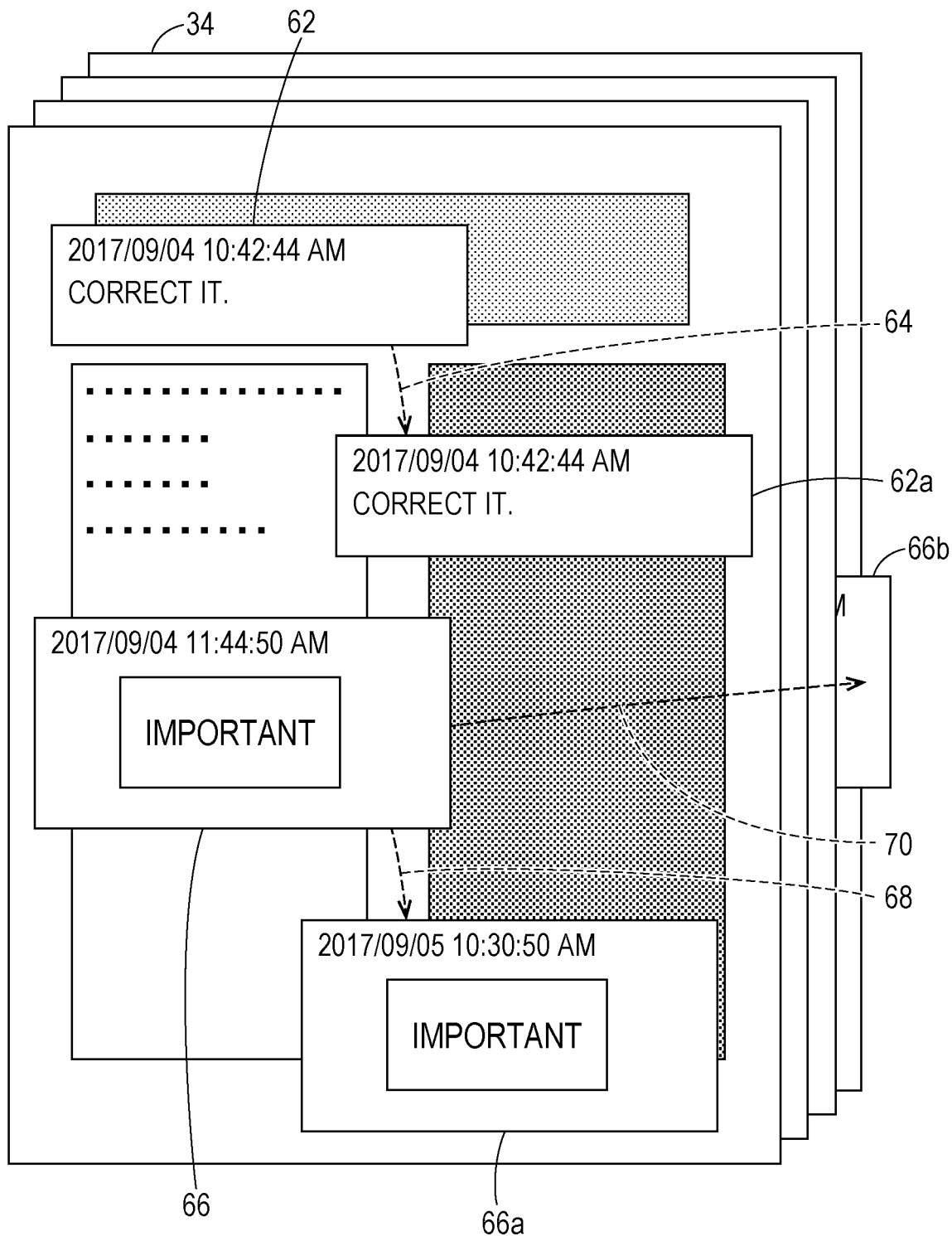
FIG. 15 is an enlarged view of a document and notes.

Other examples of the second exemplary embodiment are described below with reference to FIG. 15. FIG. 15 illustrates the document 34 and notes. The note 62 is a note added to the document 34. A character string is written into the note 62 by the user, and information indicative of a date and a time of execution of the operation of writing the character string is displayed. For example, it is assumed that the note 62 has been moved on the document 34 in a direction indicated by the arrow 64 by a user's operation. A note 62*a* is the note 62 that has been moved. The note moving operation is the second operation. Therefore, the updating unit 22 does not update date and time information displayed within the note 62. Date and time information displayed within the note 62*a* is identical to the date and time information displayed within the note 62 that has not been moved. In a case where the note 62*a* is generated by copying the note 62 (i.e., in a case where a copy and paste operation is performed), the operation is the second operation, and therefore the updating unit 22 does not update the date and time information. Similarly, in a case where a shape, a size, or a color of the note 62 is changed by the user, such a changing operation is the second operation, and therefore the updating unit 22 does not update the date and time information.

In a case where the second operation is performed on a note including specific information, the updating unit 22 may update date and time information displayed within the note to information indicative of a date and a time of execution of the second operation. Meanwhile, in a case where the second operation is performed on a note that does not include specific information, the updating unit 22 may be configured not to update date and time information displayed within the note to information indicative of a date and a time of execution of the second operation. The specific information is, for example, predetermined information. The specific information may be information set by a user. This process is described below by using a specific example.

A note 66 is a note added to the document 34. A stamp image (e.g., an image representing a character string "IMPORTANT") added by a user is displayed within the note 66. This stamp image is an example of the specific information. For example, it is assumed that the note 66 has been moved on the document 34 in a direction indicated by the arrow 68 by a user's operation. A note 66*a* is the note 66 that has been moved. The note moving operation is the second operation, but since the stamp image that is the specific information is displayed within the note 66, the updating unit 22 updates date and time information displayed within the note 66 to information indicative of a date and a time of execution of the moving operation. The information indicative of the date and time of execution of the moving operation is displayed within the note 66*a*. In a case where the note 66*a* is generated by copying the note 66, this operation is the second operation, but the updating unit 22 updates the date and time information displayed within the note 66 to information indicative of a date and a time of execution of the operation. Information indicative of the date and time of the copy and paste operation is displayed within the note 66*a*. Similarly, in a case where the note 66 is moved to another page of the document 34 by a user's operation as indicated by the arrow 70, the updating unit 22 updates the date and time information displayed within the note 66 to information indicative of a date and a time of execution of the moving operation. The same also applies to a case where the copy and paste operation has been performed. A note 68*b* is the note 66 that has been moved. The same applies to a case where a shape, a size, or a color of the note 66 is changed by the user. In a case where such a changing operation is performed on the note 66 that includes the specific information, the updating unit 22 updates the date and time information.

As described above, in a case where the second operation is performed on a note that includes the specific information, date and time information is updated to information indicative of a date and a time of execution of the second operation, and thus the information indicative of the date and time of execution of the second operation is presented to a user. Updating date and time information to information indicative of a date and a time of execution of the second operation depending on information displayed within a note is sometimes convenient for a user. For example, in a case where the note includes a stamp image representing a character string "IMPORTANT", "DONE", "CAUTION", or the like, presenting a date and a time of movement of the note or a date and a time of copy and paste of the note onto a document is sometimes more convenient for the user than in a case where date and time information is not updated. That is, a date and a time of execution of the moving operation or the copy operation sometimes have importance for the user depending on information displayed within the note. By controlling display as described above, a date and a time of execution of the second operation are presented to the user in a case where a specific condition is met (specifically in a case where the specific information is included in the note).

Information other than a specific stamp image may be handled as the specific information. For example, a specific character string (e.g., a character string "IMPORTANT", "DONE", "CAUTION", or the like) may be handled as the specific information, and in a case where such a character string is written into a note, date and time information may be updated to information indicative of a date and a time of execution of the second operation.

Needless to say, in a case where the first operation is performed on a note, date and time information displayed within the note is updated to information indicative of a date and a time of execution of the first operation.

In another example, the first operation may be an operation of moving a note from a page to which the note has been added to another page, and the second operation may be an operation of moving a note within a page to which the note has been added. That is, in a case where a note is moved within the same page, the updating unit 22 may be configured not to update date and time information displayed within the note, whereas in a case where a note is moved to another page, the updating unit 22 may update date and time information to information indicative of a date and a time of execution of the moving operation. Similarly, in a case where a note is copied and pasted onto the same page, the updating unit 22 may be configured not to update date and time information, whereas in a case where a note is copied and pasted onto another page, the updating unit 22 may update date and time information to information indicative of a date and a time of execution of the copy and paste operation. Whether or not to update date and time information may be set by the user.

Figure 16:
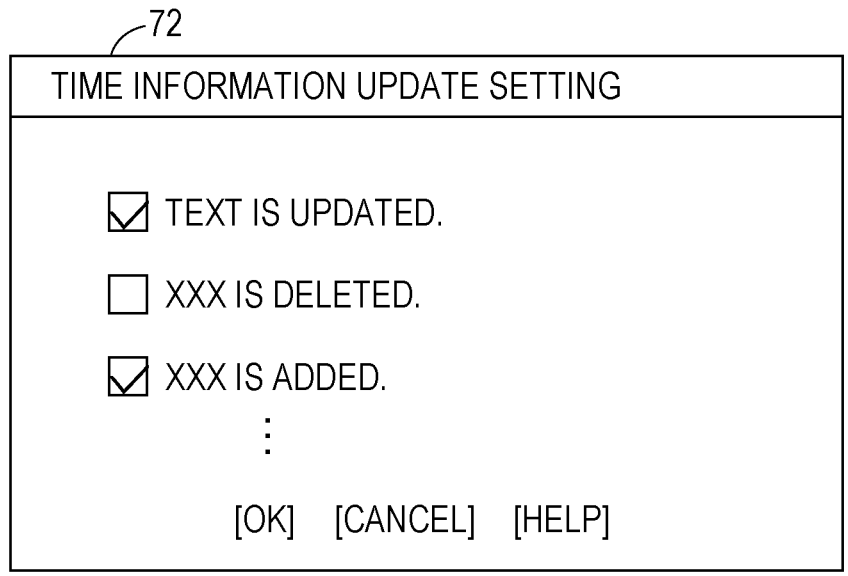
FIG. 16 illustrates a setting screen.

Contents of the first operation and the second operation may be set by a user. The setting operation is described below with reference to FIG. 16. FIG. 16 illustrates a setting screen 72 for the user's setting. The display controller 20 causes the setting screen 72 to be displayed on a display of a UI unit 14 in accordance with a user's display command. Operations performed on a note by a user are shown on the setting screen 72, and the user classifies the operations into the first operation and the second operation. For example, a check column is displayed in association with each of the operations. A controller 18 registers, as the first operation, an operation whose check column is checked by the user and registers, as the second operation, an operation whose check column is not checked. In the example illustrated in FIG. 16, an operation of "updating text (character string) within note" and an operation of "adding XXX (e.g., annotation) to note" are designated as the first operation by the user. Meanwhile, an operation of "deleting XXX from note" is designated as the second operation by the user. The updating unit 22 updates date and time information in accordance with a condition set on the setting screen 72. For example, in a case where a text within a note is updated, the updating unit 22 recognizes the updating operation as the first operation and updates date and time information. Meanwhile, in a case where an annotation XXX is deleted from a note, the updating unit 22 recognizes the deleting operation as the second operation and does not update date and time information.

The updating unit 22 may update date and time information in a case where at least one of plural first operations designated by the user is performed or may update date and time information in a case where all of the plural first operations are performed. Such a condition may be set by the user.

Furthermore, in a case where a whole text (character string) within a note is updated, i.e., in a case where the whole text within the note is deleted and another text is written into the note, the updating unit 22 may update date and time information to information indicative of a date and a time of the update. The updating unit 22 may be configured not to update date and time information in a case where part of the text within the note is updated.

The first operation may be a predetermined combination of operations. For example, assume that a combination of text (character string) editing operation and specific annotation adding operation is determined as the first operation. In a case where the editing operation and the adding operation are performed on a note, the updating unit 22 updates date and time information to information indicative of a date and a time of execution of the editing operation or the adding operation. For example, in a case where an operation included in the combination is performed and another operation included in the combination is performed within a predetermined period from a date and a time of execution of the initially executed operation, the updating unit 22 may update date and time information to information indicative of the date and time of execution of the initially executed operation or information indicative of a date and a time of execution of the last operation. This is described by using the above example. In a case where the adding operation is executed within a limited period from a date and a time of execution of the editing operation, the updating unit 22 updates date and time information to information indicative of a date and a time of execution of the editing operation or the adding operation. The same applies to a case where the adding operation is executed earlier and the editing operation is executed later. In a case where all of the operations included in the combination are not executed within the limited period, the updating unit 22 may be configured not to update date and time information or may update the date and time information every time an individual operation is executed.

Third Exemplary Embodiment

Figure 17:
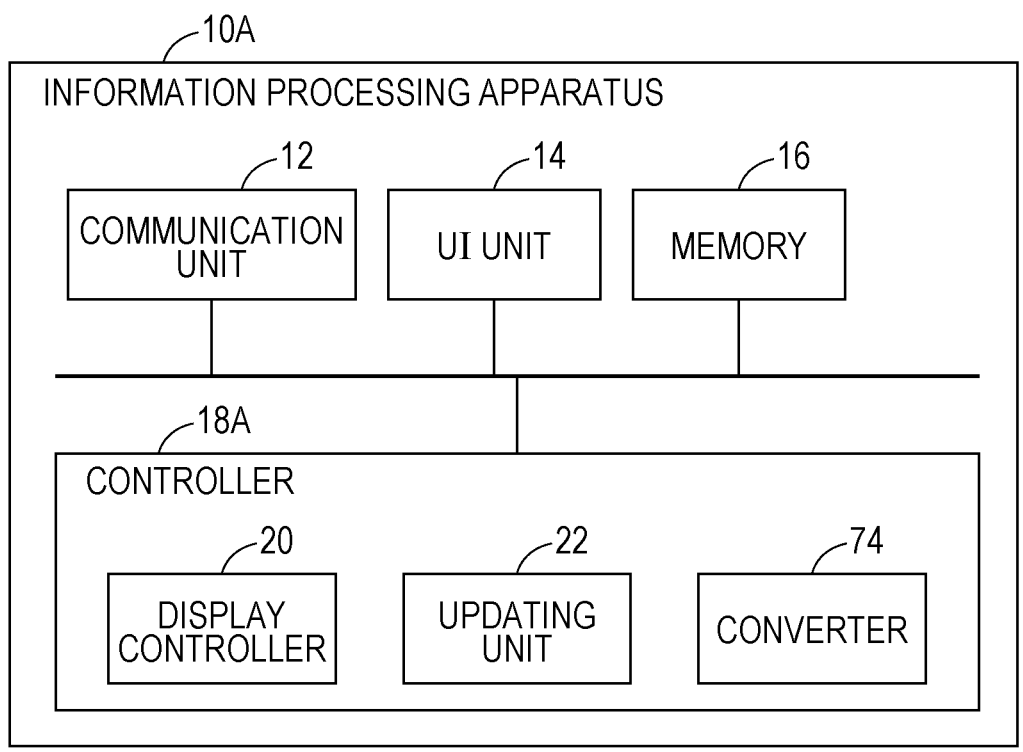
FIG. 17 is a block diagram illustrating an information processing apparatus according to a third exemplary embodiment.

A third exemplary embodiment according to the present invention is described below. FIG. 17 illustrates an example of an information processing apparatus 10A according to the third exemplary embodiment. The information processing apparatus 10A includes a communication unit 12, a UI unit 14, and a memory 16 as in the information processing apparatus 10 according to the first exemplary embodiment. These constituent elements are identical to those in the first exemplary embodiment, and therefore description thereof is omitted. The information processing apparatus 10A includes a controller 18A instead of the controller 18 that is included in the information processing apparatus 10. The controller 18A includes a display controller 20, an updating unit 22, and a converter 74. The display controller 20 and the updating unit 22 are identical to those in the first exemplary embodiment. The following description focuses on the converter 74.

The converter 74 has a function of converting a time of an operation executed on an additional object on a document in a first place on the basis of a relationship between the first place where the operation was executed on the additional object and a second place where the document is displayed. The display controller 20 causes information indicative of the converted time to be displayed on a display of the UI unit 14 in association with the additional object. The additional object is, for example, a note. The operation executed on the additional object is, for example, an operation of adding the additional object to the document, the first operation or the second operation described in the second exemplary embodiment, or the like. The first place and the second place are, for example, countries or geographical regions.

The converter 74 may execute a time difference correction mode, may execute a code assigning mode, or may execute both of these modes. The time difference correction mode is a function (a function corresponding to a first function) of correcting a time difference between the first place and the second place. The code assigning mode is a function (a function corresponding to a second function) of assigning information indicative of the first place to date and time information.

In the time difference correction mode, the converter 74 calculates a converted time by correcting a time difference between the first place and the second place. That is, the converter 74 calculates a converted time by reflecting, in a time before the conversion, the time difference between the first place and the second place. For example, in an information processing apparatus 10A in which an operation (e.g., a pasting operation, the first operation, or the second operation) has been executed on a note on a document, the controller 18 adds, to data of the note, information (local date and time information) indicative of local date and time of execution of the operation on the note (a date and a time in a first place (e.g., a country or a geographical region) where the information processing apparatus 10A in which the operation has been executed on the note is placed) and information (first place information) indicative of the first place where the information processing apparatus 10A is placed. In an information processing apparatus 10A on which the document is displayed, the converter 74 reflects, in the local date and time (date and time before the conversion) indicated by the local date and time information, a time difference between a second place where the information processing apparatus 10A on which the document is displayed is placed and the first place indicated by the first place information while referring to the local date and time information and the first place information added to the data of the note and thus corrects the time difference and calculates a converted time. For example, in a case where the first place is Japan (JP) and the second place is the East of the United States (US), the converter 74 of the information processing apparatus 10A placed in the East reflects a time difference between Japan and the East of the united States in local date and time information (date and time information based on a date and a time of Japan) and thus corrects the time difference and calculates converted date and time (date and time information based on a date and a time of the East of the united States). Information indicative of time differences between places (a time difference between countries, a time difference between geographical regions, and a time difference between a country and a geographical region) may be stored in the memory 16 of the information processing apparatus 10A or may be acquired by the controller 18 from an external apparatus such as a server by using, for example, the Internet.

Information indicative of a place (e.g., a country or a geographical region) where the information processing apparatus 10A is placed is, for example, entered by a user. In another example, the controller 18 may specify a place where the information processing apparatus 10 is placed on the basis of positional information acquired by using a global positioning system (GPS) function. For example, information indicative of a place where the information processing apparatus 10A is placed may be entered by the user when document management software is installed into the information processing apparatus 10A or a later timing. Alternatively, the place may be specified on the basis of positional information. The information indicative of the place is stored in the memory 16. In the information processing apparatus 10A placed in the first place, information (first place information) indicative of the first place is added to data of a note.

In the information processing apparatus 10A in which an operation has been executed on the note, local date and time information and information (reference time information) indicative of a reference time (e.g., Greenwich mean time (GMT) or Coordinate Universal Time (UTC)) may be added to data of the note. In the information processing apparatus 10A on which a document is displayed, the converter 74 may correct a time difference and calculate converted date and time by referring to local date and time information and reference time information added to the date of the note.

The display controller 20 causes information indicative of the converted date and time obtained by correcting the time difference to be displayed as information indicative of the converted time on the display of the UI unit 14 in association with the note.

In the code assigning mode, the controller 18 of the information processing apparatus 10A placed in the first place adds first place information to data of a note pasted onto a document. The converter 74 of the information processing apparatus 10A placed in the second place specifies the first place where the operation was executed on the note by referring to the first place information added to the data of the note pasted onto the displayed document. Next, the converter 74 adds information (e.g., a country code or a regional code) indicative of the first place to date and time information (local date and time information before the conversion) displayed within the note. The display controller 20 causes information including the date and time information and the information indicative of the first place to be displayed as information indicative of a converted time on the display of the UI unit 14 in association with the note.

The controller 18 may function as a setting unit that sets a mode to be executed. For example, the display controller 20 causes a mode setting screen to be displayed on the display, and in a case where a user designates a mode by operating the UI unit 14, the controller 18 sets the mode designated by the user as a mode to be executed and controls operation of the display controller 20 and the converter 74 in accordance with the mode. The controller 18 sets the time difference correction mode as a mode to be executed in a case where the time difference correction mode is designated by the user, sets the code assigning mode as a mode to be executed in a case where the code assigning mode is designated by the user, and sets both of the time difference correction mode and the code assigning mode as modes to be executed in a case where both of the time difference correction mode and the code assigning mode are designated by the user.

The mode to be executed may be set by a user in the first place or may be set by a user in the second place.

For example, in a case where a mode is designated by a user by using the information processing apparatus 10A in the first place, the controller 18 adds information (mode information) indicative of the mode designated by the user to data of a note. The controller 18 of the information processing apparatus 10A in the second place executes the mode indicated by the mode information added to the data of the note. In this way, display is controlled in accordance with an instruction from the user in the first place.

In a case where a mode is designated by a user by using the information processing apparatus 10A in the second place, the controller 18 executes the mode designated by the user. In this way, display is controlled in accordance with an instruction from the user in the second place.

In a case where a mode is designated in both the first place and the second place, a mode selected in the second place is given priority, and the controller 18 of the information processing apparatus 10A placed in the second place executes the mode set in the second place. In this way, even in a case where a mode is designated in both of the places, display is controlled in accordance with an instruction from the user in the second place.

A mode may be designated by adding an annotation to a note. The controller 18 of the information processing apparatus 10A in which an operation of adding an annotation has been executed sets the time difference correction mode as a mode to be executed in a case where the annotation added to a note is an annotation associated with the time difference correction mode and sets a code assigning mode as a mode to be executed in a case where the annotation added to the note is an annotation associated with the code assigning mode.

The third exemplary embodiment is described below by using a specific example.

Figure 18:
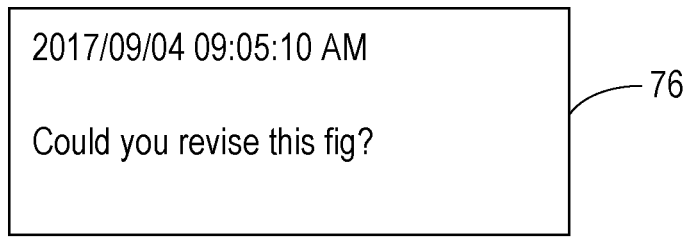
FIG. 18 illustrates a note.

FIG. 18 illustrates a note 76 pasted onto a document. For convenience of description, the document is not illustrated in FIG. 18. For example, it is assumed that a user pastes the note 76 with which date and time information is associated onto the document and writes a character string into the note 76 by using the information processing apparatus 10A in Japan (JP) that is the first place. In this case, the updating unit 22 of the information processing apparatus 10A updates the date and time information (e.g., information indicative of a date and a time of pasting of the note 76 onto the document) to information indicative of a date and a time of writing of the character string into the note 76, as in the second exemplary embodiment. The date and time information displayed within the note 76 is information indicative of Japanese date and time of execution of the operation on the note 76. The controller 18 of the information processing apparatus 10A adds, to data of the note, local date and time information indicative of local date and time (date and time in Japan) of writing of the character string into the note 76 and first place information indicative of Japan. For example, a character string "Could you revise this fig?" is written into the note 76 by the user. In a case where the date and time of the writing operation is 9:5:10 AM on Sep. 4, 2017 in Japan time, a character string "2017/09/04 09:05:10 AM" indicative of the date and time is displayed within the note 76.

Figure 19:
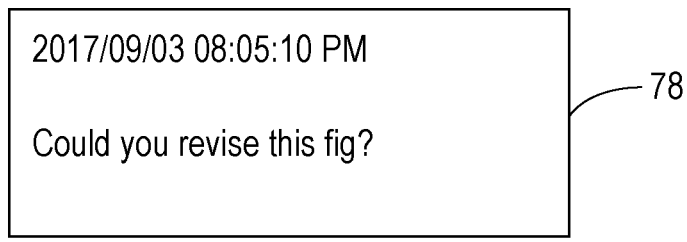
FIG. 19 illustrates a note.

FIG. 19 illustrates a note 78. The note 78 is a note displayed on the information processing apparatus 10A placed in the second place. For example, it is assumed that the second place is the East of the United States (US). For example, data of the document on which the note 76 is pasted is sent from the information processing apparatus 10A (referred to as a first information processing apparatus 10A for convenience of description) placed in Japan to the information processing apparatus 10A (referred to as a second information processing apparatus 10A for convenience of description) placed in the East of the United States, and the document is displayed on the display of the second information processing apparatus 10A. The data of the document may be sent through a communication path such as the Internet or may be sent by using a recording medium (e.g., a hard disk or a memory).

It is assumed here that the time difference correction mode is executed. The converter 74 of the second information processing apparatus 10A converts local date and time information expressed based on Japan time into a time expressed based on the Eastern time of the United States by reflecting a time difference between Japan and the East of the United States in the local date and time information. For example, a time difference of 13 hours exists between Japan and the East of the United States, and the converter 74 calculates a converted time by reflecting the time difference in the local date and time information. The display controller 20 causes information indicative of the converted time to be displayed within the note 78. The character string displayed within the note 78 is identical to the character string displayed within the note 76. The date and time based on Japan time is 9:5:10 AM on Sep. 4, 2017. In a case where the date and time are expressed based on the East time of the United States. The date and time are 8:5:10 PM on Sep. 3, 2017. This time is calculated by the converter 74. The display controller 20 causes a character string "2017/09/03 08:05:10 PM" indicative of the converted date and time to be displayed within the note 78.

Even in a case where a time difference exists between the first place and the second place, date and time information based on the second place is presented to a user by executing the time difference correction mode as described above.

The controller 18 of the second information processing apparatus 10A may overwrite date and time information (local date and time information) before conversion added to data of a note with date and time information after conversion or may add both of the date and time information before conversion and the date and time information after conversion to the data of the note and cause the date and time information after conversion to be displayed on the display in association with the note when a document is displayed.

Figure 20:
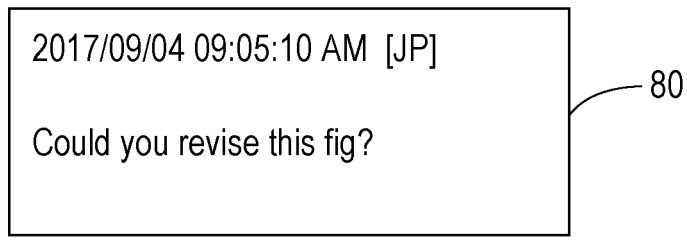
FIG. 20 illustrates a note.

FIG. 20 illustrates another note 80. The note 80 is a note displayed on the second information processing apparatus 10A placed in the East of the United States that is the second place. It is assumed here that the code assigning mode is executed. The converter 74 of the second information processing apparatus 10A specifies the first place (Japan) on the basis of first place information (information indicative of Japan) added to data of the note. Next, the converter 74 adds information (e.g., a country code indicative of Japan) indicative of the first place to date and time information. The display controller 20 causes the date and time information to which the country code has been added to be displayed within the note 80. The date and time information is information indicative of a date and a time based on Japan that is the first place. Accordingly, a character string "2017/09/04 09:05:10 AM" indicative of the date and time is displayed within the note 80. Furthermore, a character string "JP" that is an example of the country code of Japan is displayed in addition to the character string indicative of the date and time. The character string displayed within the note 80 is identical to the character string displayed within the note 76.

By executing the code assigning mode, the user is notified that date and time information associated with a note is date and time information based on the first place.

Figure 21:
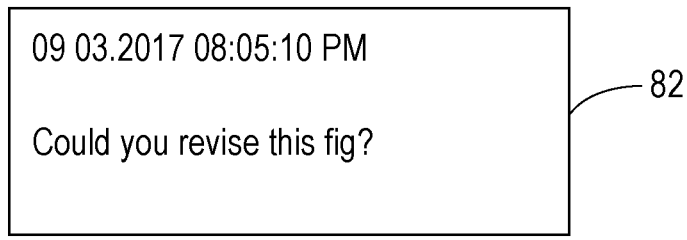
FIG. 21 illustrates a note.

The display controller 20 may cause converted date and time information to be displayed within a note in accordance with a display form suitable for the second place. For example, display forms suitable for second places are determined in advance, and information indicative of the display forms of the second places may be stored in the memory 16 of the information processing apparatus 10A or may be provided from an external apparatus such as a server to the information processing apparatus 10A. This process is described in detail below with reference to FIG. 21. FIG. 21 illustrates a note 82. The note 82 is a note displayed on the second information processing apparatus 10A placed in the East of the United States that is the second place. It is assumed here that the time difference correction mode is executed. The display controller 20 of the second information processing apparatus 10A causes converted date and time information to be displayed within the note 82 in accordance with a display form suitable for the East of the United States. Specifically, the display controller 20 causes a character string "09 03.2017 08:05:10 PM" expressed in a display form suitable for the East of the United States to be displayed within the note 82 instead of the character string "2017/09/03 08:05:10 PM" (the character string indicative of the converted date and time information) expressed in a display form suitable for Japan. In this way, date and time information is displayed in accordance with a display form familiar to a user in the second place. The display form may be changed also in a case where the code assigning mode is executed.

The display controller 20 of the second information processing apparatus 10A placed in the second place causes date and time information before conversion to be displayed on the display in association with a note, and in a case where the date and time information before conversion is designated by a user, the display controller 20 may cause converted date and time information to be displayed on the display instead of the date and time information before conversion or together with the date and time information before conversion. This is described by using a specific example. For example, it is assumed that the note 78 illustrated in FIG. 19 is displayed on the display of the second information processing apparatus 10A. In this case, the display controller 20 causes a character string "2017/09/04 09:05:10 AM" indicative of a date and a time before conversion to be displayed within the note 78. In a case where the character string "2017/09/04 09:05:10 AM" is designated by a user, the display controller 20 causes a character string "2017/09/03 08:05:10 PM" indicative of converted date and time to be displayed within the note 78 instead of the character string "2017/09/04 09:05:10 AM" before conversion. In this way, the date and time information before conversion and the converted date and time information are separately presented to the user. The character string indicative of the converted date and time may be a character string indicative of a date and a time converted by execution of the time difference correction mode or may be a character string indicative of a date and a time converted by execution of the code assigning mode.

Figure 22:
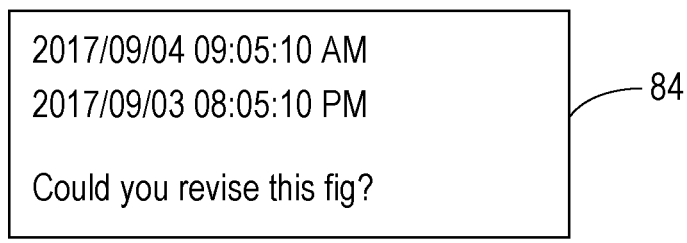
FIG. 22 illustrates a note.

In another example, in a case where a character string indicative of a date and a time before conversion is designated by a user, the display controller 20 may cause both of the character string indicative of the date and time before conversion and a character string indicative of converted date and time to be displayed within a note 84 as illustrated in FIG. 22. For example, the character string indicative of the date and time before conversion and the character string indicative of the converted date and time are written side by side. In this way, both of the character string indicative of the date and time before conversion and the character string indicative of the converted date and time are presented to a user at one time.

The controller 18 of the second information processing apparatus 10A may execute the time difference correction mode in a case where specific information is not included in a note and may execute the code assigning mode in a case where the specific information is included in the note. The specific information is, for example, information concerning a time. The information concerning a time is information different from date and time information (information indicative of a date and a time of execution of an operation on a note) associated with the note and may be a character string indicative of a time (e.g., a date and a time, a date, or a time) written into the note by a user or may be an annotation concerning a time added to the note by the user. The controller 18 may extract a character string indicative of a time written within the note, for example, by applying language processing (e.g., known natural language processing such as morphological analysis or syntax analysis) to the character string written into the note. Furthermore, the controller 18 may extract an annotation concerning a time by analyzing the annotation added to the note.

In a case where information concerning a time (e.g., information indicative of a date and a time) is written within a note, a time itself (e.g., a date and a time) displayed based on a time in the first place is sometimes meaningful. For example, it is assumed that a character string "CHECK IT UNTIL SEPTEMBER 5" is written into a note by a user as an operation on the note at 9:5:10 AM on September 4 in Japan that is the first place. In this case, a character string "2017/09/04 09:05:10 AM" indicative of date and time information is displayed within the note, and the written character string "CHECK IT UNTIL SEPTEMBER 5" is displayed. In such an example, the date September 5 sometimes has meaning in relation to September 4 on which the character string was written. That is, checking until September 5 on the basis of Japan time September 4 on which the character string was written has meaning, and it is estimated that the sentence written in the note has such an intention. In such a case, in a case where the date and time information is converted on the basis of a time difference between the first place and the second place (e.g., a time difference between Japan and the East of the United States), sometimes the above intention is not conveyed to a person who reads the note. In view of this, in a case where information concerning a time is written in a note, information indicative of the first place is presented to the user while preventing occurrence of the above problem by executing the code assigning mode instead of executing the time difference correction mode. In a case where information concerning a time is not written in a note, it is estimated that occurrence of the above problem does not occur even in a case where the time difference correction mode is executed, and therefore the controller 18 executes the time difference correction mode.

In a case where plural notes are pasted onto a document, the controller 18 may execute the time difference correction mode for each of the notes in a case where the plural notes are pasted onto the document in different first places and execute the code assigning mode in other cases. For example, it is assumed that notes are added to a document in Japan and the East of the United States, and the document is displayed in the United Kingdom (UK). In this case, the controller 18 of a third information processing apparatus 10A placed in the United Kingdom executes the time difference correction mode. That is, the converter 74 calculates a converted time by reflecting, for each of the notes pasted on the document, a time difference between the first place in which the note was pasted and the second place (the United Kingdom) in a date and a time before conversion. Specifically, the converter 74 reflects a time difference between Japan and the United Kingdom in date and time information associated with a note pasted in Japan and thereby converts the date and time information associated with the note into date and time information based on the UK time. Similarly, the converter 74 reflects a time difference between the East of the United States and the United Kingdom in date and time information associated with a note pasted in the East of the United States and thereby converts the date and time information associated with the note into date and time information based on the UK time. In this way, the pieces of date and time information associated with all of the notes pasted on the document are displayed on the basis of the UK time, and therefore pieces of date and time information based on the same date and time standard are presented to the user as compared with a case where the time difference correction mode and the code assigning mode are mixed or a case where the code assigning mode is executed.

The controller 18 may execute the time difference correction mode in a case where the number of different first places is equal to or larger than a predetermined threshold value and execute the code assigning mode in other cases. For example, it is assumed that the threshold value is "3". The controller 18 executes the time difference correction mode in a case where the number of first places including a country and a geographical region is equal to or larger than 3 (e.g., three countries) and executes the code assigning mode in other cases.

The information processing apparatus 10 is provided, for example, by cooperation between hardware and software. Specifically, the information processing apparatus 10 includes one or more processors such as CPUs (not illustrated). The one or more processors read out and execute a program stored in a storage device (not illustrated), and thus functions of the units of the information processing apparatus 10 are realized. The program is stored in the storage device via a storage medium such as a CD or a DVD or via a communication path such as a network. In another example, each unit of the information processing apparatus 10 may be provided, for example, by a hardware resource such as a processor, an electronic circuit, or an application specific integrated circuit (ASIC). Each unit of the information processing apparatus 10 may be provided by using a device such as a memory. In still another example, each unit of the information processing apparatus 10 may be provided by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a converter that converts a time of execution of an operation on an additional object added to a document in a first place, wherein
the time of execution is recorded according to a time zone of the first place before conversion and is converted according to a time zone of a second place different from the first place, the first place being a place of execution of the operation on the additional object and the second place being a place where the document is displayed; and
a display controller that causes information indicative of a converted time to be displayed on a display in association with the additional object, wherein:
the information indicative of the converted time has a first format when content of the additional object satisfies a preset condition and has a second format different from the first format when the content of the additional object does not satisfy the preset condition;
the first format is generated according to a code assigning mode of the converter and displays a code representing the first place adjacent the time of execution recorded according to the time zone of the first place;
the second format is generated according to a time difference correction mode of the converter and displays a converted time according to the time zone of the second place which corresponds to the time of execution recorded according to the time zone of the first place; and
the preset condition is satisfied when it is determined that the content of the additional object includes time-related information.

2. The information processing apparatus according to claim 1, wherein
the information indicative of the converted time is a time obtained by correcting a time difference between the first place and the second place.

3. The information processing apparatus according to claim 1, wherein
the information indicative of the converted time is information including information indicative of the time before the conversion and information indicative of the first place.

4. The information processing apparatus according to claim 1, further comprising
a setting unit that sets
a first function of displaying, as the information indicative of the converted time, information indicative of a time obtained by correcting a time difference between the first place and the second place or
a second function of displaying, as the information indicative of the converted time, information including information indicative of the time before the conversion and information indicative of the first place,
wherein the display controller causes the information indicative of the converted time to be displayed on the display in accordance with the first function or the second function set by the setting unit.

5. The information processing apparatus according to claim 4, wherein
the setting unit sets the first function or the second function in accordance with an instruction from a user in the first place.

6. The information processing apparatus according to claim 4, wherein
the setting unit sets the first function or the second function in accordance with an instruction from a user in the second place.

7. The information processing apparatus according to claim 1, wherein
the display controller causes information indicative of a time obtained by correcting a time difference between the first place and the second place to be displayed on the display as the information indicative of the converted time in a case where the additional object does not include specific information and causes information including information indicative of the time before the conversion and information indicative of the first place to be displayed on the display as the information indicative of the converted time in a case where the additional object includes the specific information.

8. The information processing apparatus according to claim 7, wherein
the specific information is information concerning a time.

9. The information processing apparatus according to claim 1, wherein
the display controller causes information indicative of the time before the conversion to be displayed on the display in the second place and causes information indicative of the converted time to be displayed on the display in a case where the information indicative of the time before the conversion is designated by a user.

10. The information processing apparatus according to claim 9, wherein
the display controller causes the information indicative of the converted time to be displayed on the display together with the information indicative of the time before the conversion in a case where the information indicative of the time before the conversion is designated by the user.

11. The information processing apparatus according to claim 1, wherein
the display controller causes the information indicative of the converted time to be displayed on the display in accordance with a display form suitable for the second place.

12. The information processing apparatus according to claim 1, wherein
in a case where a plurality of additional objects are added to the document in a plurality of different first places, the display controller causes, for each respective one of the additional objects, information indicative of a time obtained by correcting a time difference between a corresponding first place that is a place of execution of the operation on the respective additional object and the second place to be displayed on the display as the information indicative of the converted time.

13. The information processing apparatus according to claim 1, wherein:
when there is a time difference between a time when the additional object is created, edited, or moved and a time when the additional object is confirmed, the recorded time of execution is the time when the additional object is confirmed; and
while the additional object is being operated, the additional object that is not confirmed is displayed in a different state from the additional object that is confirmed.

14. A non-transitory computer readable medium storing a program causing a computer to execute a process comprising:
converting a time of execution of an operation on an additional object added to a document in a first place, wherein
the time of execution is recorded according to a time zone of the first place before conversion and is converted according to a time zone of a second place different from the first place, the first place being a place of execution of the operation on the additional object and the second place being a place where the document is displayed; and
causing information indicative of a converted time to be displayed on a display in association with the additional object, wherein:
the information indicative of the converted time has a first format when content of the additional object satisfies a preset condition and has a second format different from the first format when the content of the additional object does not satisfy the preset condition;
the first format is generated according to a code assigning mode and displays a code representing the first place adjacent the time of execution recorded according to the time zone of the first place;
the second format is generated according to a time difference correction mode and displays a converted time according to the time zone of the second place which corresponds to the time of execution recorded according to the time zone of the first place; and
the preset condition is satisfied when it is determined that the content of the additional object includes time-related information.

15. An information processing apparatus comprising:
converter means for converting a time of execution of an operation on an additional object added to a document in a first place, wherein
the time of execution is recorded according to a time zone of the first place before conversion and is converted according to a time zone of a second place different from the first place, the first place being a place of execution of the operation on the additional object and the second place being a place where the document is displayed; and
display controller means for causing information indicative of a converted time to be displayed on a display in association with the additional object, wherein:
the information indicative of the converted time has a first format when content of the additional object satisfies a preset condition and has a second format different from the first format when the content of the additional object does not satisfy the preset condition;
the first format is generated according to a code assigning mode of the converter means and displays a code representing the first place adjacent the time of execution recorded according to the time zone of the first place;
the second format is generated according to a time difference correction mode of the converter means and displays a converted time according to the time zone of the second place which corresponds to the time of execution recorded according to the time zone of the first place; and
the preset condition is satisfied when it is determined that the content of the additional object includes time-related information.

\* \* \* \* \*